US006302085B1

(12) United States Patent
Sekine et al.

(10) Patent No.: US 6,302,085 B1
(45) **Date of Patent: *Oct. 16, 2001**

(54) APPARATUS AND METHOD FOR DETECTING CRANK ANGLE OF ENGINE

(75) Inventors: Manabu Sekine; Satoru Watanabe, both of Atsugi (JP)

(73) Assignees: Unisia Sec's Corporation, Atsugi; Nissan Motor Co. Ltd., Yokohama, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/260,488

(22) Filed: Mar. 2, 1999

(30) Foreign Application Priority Data

| | | |
|---|---|---|
| Mar. 2, 1998 | (JP) | 10-049617 |
| Mar. 6, 1998 | (JP) | 10-055186 |
| Mar. 10, 1998 | (JP) | 10-058166 |

(51) Int. Cl.[7] .............................. G01P 3/481; F02D 43/04

(52) U.S. Cl. .............................. 123/406.62; 123/90.31; 123/90.16; 123/90.17; 123/406.18; 73/116; 73/117.3

(58) Field of Search .............................. 123/90.15, 90.17, 123/90.16, 90.18, 90.31, 406.18, 406.62, 406.63; 73/116, 117.2, 117.3

(56) References Cited

U.S. PATENT DOCUMENTS

| | | | | |
|---|---|---|---|---|
| 4,873,958 | * | 10/1989 | Abe | 123/406.63 |
| 4,953,531 | * | 9/1990 | Abe | 123/406.63 |
| 5,269,274 | * | 12/1993 | Flaetgen et al. | 123/406.62 |
| 5,460,134 | * | 10/1995 | Ott et al. | 123/406.62 |
| 5,462,022 | * | 10/1995 | Ushida | 123/90.17 |
| 5,469,823 | * | 11/1995 | Ott et al. | 123/406.62 |
| 5,522,352 | * | 6/1996 | Adachi et al. | 123/90.15 |
| 5,630,396 | * | 5/1997 | Fukui et al. | 123/406.62 |
| 5,632,246 | | 5/1997 | Fukui et al. | 123/406.18 |
| 5,671,714 | * | 9/1997 | Fukui et al. | 123/406.62 |
| 5,715,780 | * | 2/1998 | Haller | 123/90.17 |
| 5,769,044 | * | 6/1998 | Moriya | 123/90.17 |
| 5,924,397 | * | 7/1999 | Moriya et al. | 73/116 |
| 5,979,413 | * | 11/1999 | Ohnuma et al. | 123/491 |
| 6,006,152 | | 12/1999 | Schwarzenthal | 701/102 |
| 6,041,647 | * | 3/1999 | Matsuoka | 123/90.17 |
| 6,070,567 | * | 6/2000 | Kakizaki et al. | 123/406.25 |

FOREIGN PATENT DOCUMENTS

| | | |
|---|---|---|
| 43 27 218 | 2/1995 | (DE) . |
| 196 10 121 | 10/1996 | (DE) . |
| 196 27 796 | 1/1998 | (DE) . |
| 07-083080 | 3/1995 | (JP) . |

* cited by examiner

*Primary Examiner*—Weilun Lo
*Assistant Examiner*—Hieu T. Vo
(74) *Attorney, Agent, or Firm*—Foley & Lardner

(57) ABSTRACT

A crank angle detecting apparatus of an engine is equipped with a camshaft sensor for outputting the same number of pulse signals CAM as the cylinder number at every stroke phase difference between the cylinders, and further equipped with a crankshaft sensor for outputting a position signal POS 10 at every unit crank angle. A signal of the output position signals POS 10 is omitted at the position where the leading pulse of the pulse signals CAM is generated. On the other hand, a counter CNTFST is equipped for counting up the generation of the position signals POS 10 which will be cleared every time the pulse signal CAM is generated. When the value of the counter CNTFST is equal to or above a threshold value at the time the pulse signal CAM is generated, then the pulse signal CAM is determined as a leading pulse, and the first position signal POS 10 output after the determination is set as the reference position.

12 Claims, 9 Drawing Sheets

APPARATUS AND METHOD FOR DETECTING CRANK ANGLE OF ENGINE

BACKGROUND OF THE INVENTION (1) Field of the Invention

The present invention relates to an apparatus and method for detecting the crank angle of an engine, and more specifically, to a technique for detecting the crank angle of an engine by use of a camshaft sensor and a crankshaft sensor.

(2) Related Art of the Invention

It was common in the prior art to provide to the engine a camshaft sensor for outputting a pulse signal (reference angle signal) at every crank angle corresponding to a control reference position of each cylinder, and a crankshaft sensor for outputting a pulse signal (unit angle signal) at every unit crank angle. In such case, the unit angle signal immediately after the output of the reference angle signal from the camshaft sensor (or the unit angle signal after, by predetermined numbers, the unit angle signal immediately after said output) is set as a control reference position, utilized to control the ignition timing or the fuel injection timing of the engine.

However, according to the prior art method, the permissible divergence in the timing for generating the signal between the camshaft sensor and the crankshaft sensor was only a unit crank angle at maximum. Therefore, in order to detect the reference position with high accuracy while maintaining the angle resolution of the crankshaft sensor, it was either necessary to minimize to the utmost the dispersion caused when manufacturing or mounting the sensor, or it was necessary to perform an individual adjustment operation.

Moreover, if the reference position was to be detected by the signal from the camshaft sensor in an engine equipped with a variable valve device for variably controlling the valve timing of the intake valve by varying the phase of the intake side camshaft with respect to the crankshaft, it was requested that a camshaft sensor be equipped to the discharge side camshaft whose phase will not be changed with respect to the crankshaft. However, in order to detect the phase of the intake side camshaft, it was necessary to provide a camshaft sensor to the intake side camshaft as well, which led to increase in the number of sensors to be mounted, and as a result, raised the manufacturing cost thereof.

SUMMARY OF THE INVENTION

The present invention was aimed at solving the above-mentioned prior art problems, and the object of the invention is to provide a constitution for detecting a control reference position by the combination of a camshaft sensor for outputting a reference signal and a crankshaft sensor for outputting a unit angle sensor, wherein the permissible range of phase deviation between each detection signals may be widened, without deteriorating the resolution of the unit angle detection.

Further object of the present invention is to provide a constitution utilizing a camshaft sensor for outputting a plurality of signals including a reference angle signal, wherein the reference angle signal may be detected at an early stage and with small operation load.

Another object of the present invention is to provide an engine equipped with a variable valve device for varying the phase of the camshaft with respect to the crankshaft, wherein a camshaft sensor is only equipped to the camshaft being varied of its phase, so as to enable detection of the crank angle and the phase of the camshaft.

In order to achieve the above-mentioned objects, the present invention is so constituted that a crankshaft sensor for outputting a detection signal synchronously with the rotation of a crankshaft outputs a detection signal at every unit crank angle, and at the same time, an omission in the output of the detection signal is set to be generated at every constant crank angle, while a camshaft sensor for outputting a detection signal synchronously with the rotation of a camshaft outputs a detection signal at least at every position where the detection signal to be output by the crankshaft sensor is omitted.

According to such a constitution, the detection signal of the camshaft sensor is output to the portion where the generation interval of the detection signal from the crankshaft sensor is widened due to omission of signal output. Therefore, the permissible range of phase deviation between the detection signal of the camshaft sensor and the detection signal of the crankshaft sensor are widened at positions where the detection signals to be output by the crankshaft sensor are omitted.

In the above case, it is preferable that the positions where detection signals to be output by the crankshaft sensor are omitted should be set to positions of every crank angle corresponding to the stroke phase difference between the cylinders.

According to such a constitution, the detection signals to be output by the crankshaft sensor are omitted at every stroke phase difference between cylinders, and at the same time, detection signals are output by the camshaft sensor at portions where the signals are omitted.

Even further, it is preferable that the camshaft sensor outputs detection signals at every position where the detection signals to be output by the crankshaft sensor are omitted, and subsequent to the output of detection signal to each omitted position, outputs a detection signal for the distinction of the cylinders.

According to such a constitution, the reference position may be detected, and also it may be specified which cylinder the reference position corresponds to based on the detection signal output by the camshaft sensor.

Moreover, it may be preferable to detect the reference position of engine control based on the correlation between the detection signal from the crankshaft sensor and the detection signal from the camshaft sensor.

According to such a constitution, the portion of signal omission of the crankshaft sensor may be specified based on the detection signal from the camshaft sensor, and the reference position of the engine control may be specified with the portion of signal omission as the reference.

In the above case, it is also preferable to count up the value on a counter for counting every output of the detection signal by the crankshaft sensor, and on the other hand, to clear the value on the counter at every output of the detection signal by the camshaft sensor, and based on the result of comparison between the value of the counter and a threshold value stored in advance, to distinguish the detection signals output by the camshaft sensor in correspondence to the positions where the detection signals to be output by the crankshaft sensor are omitted.

According to such a constitution, the detection signals are output by the camshaft sensor to each of the positions where the signals from the crankshaft sensor are omitted, and subsequent to the output of the detection signal, the signal for distinguishing the cylinders are output by the camshaft sensor. Thus, based on the generation cycle of the detection signal from the camshaft sensor, detection may be performed on whether a position corresponds to the signal omitted position. Therefore, the generation cycle is measured by the counted value of the detection signal output by the crankshaft sensor.

Moreover, it is preferable to set the detection signal output by the camshaft sensor corresponding to the signal omission position as reference, and to detect the detection signal of the crankshaft sensor to be set as the reference position for controlling the engine.

According to such a constitution, the detection signal from the crankshaft sensor to be set as the reference position of the engine control may be specified with the signal omission position of the crankshaft sensor as reference.

Actually, the detection signal output by the crankshaft sensor for the first time after the detection signal output by the camshaft sensor corresponding to the signal omission position may be detected as the reference position for the engine control.

Further, in the case a variable valve device for varying the phase of the camshaft with respect to the crankshaft is equipped to the engine, the detection signal may be set to be output by the camshaft sensor at the position where a detection signal to be output by the crankshaft sensor is omitted, while the camshaft is placed at a most delayed angle by the variable valve device.

According to such a constitution, the reference position may be acknowledged as the position where the detection signal to be output by the crankshaft sensor is omitted, and counting the detection signals output by the crankshaft sensor with this position as reference, the crank angle may be detected.

Further, the variable valve device is generally set to control the state of the camshaft to the most delayed angle at the starting time. Thereafter, even if the variable valve device is controlled so as to vary (advance) the phase of the camshaft with respect to the crankshaft, the detection signal of the camshaft sensor appears before the reference position (signal omission position), so that the phase variation of the camshaft may be detected as the phase deviation angle between the position where the detection signal to be output by the crankshaft sensor is omitted and the detection signals output by the camshaft sensor.

These and other objects and aspects of the present invention will become apparent by the following explanation on the preferred embodiment of the invention in connection with the accompanied drawings.

DETAILED DESCRIPTION OF THE PREFERRED EMBODIMENT

Preferred embodiments of the present invention will now be explained with reference to the drawings.

Figure 1:
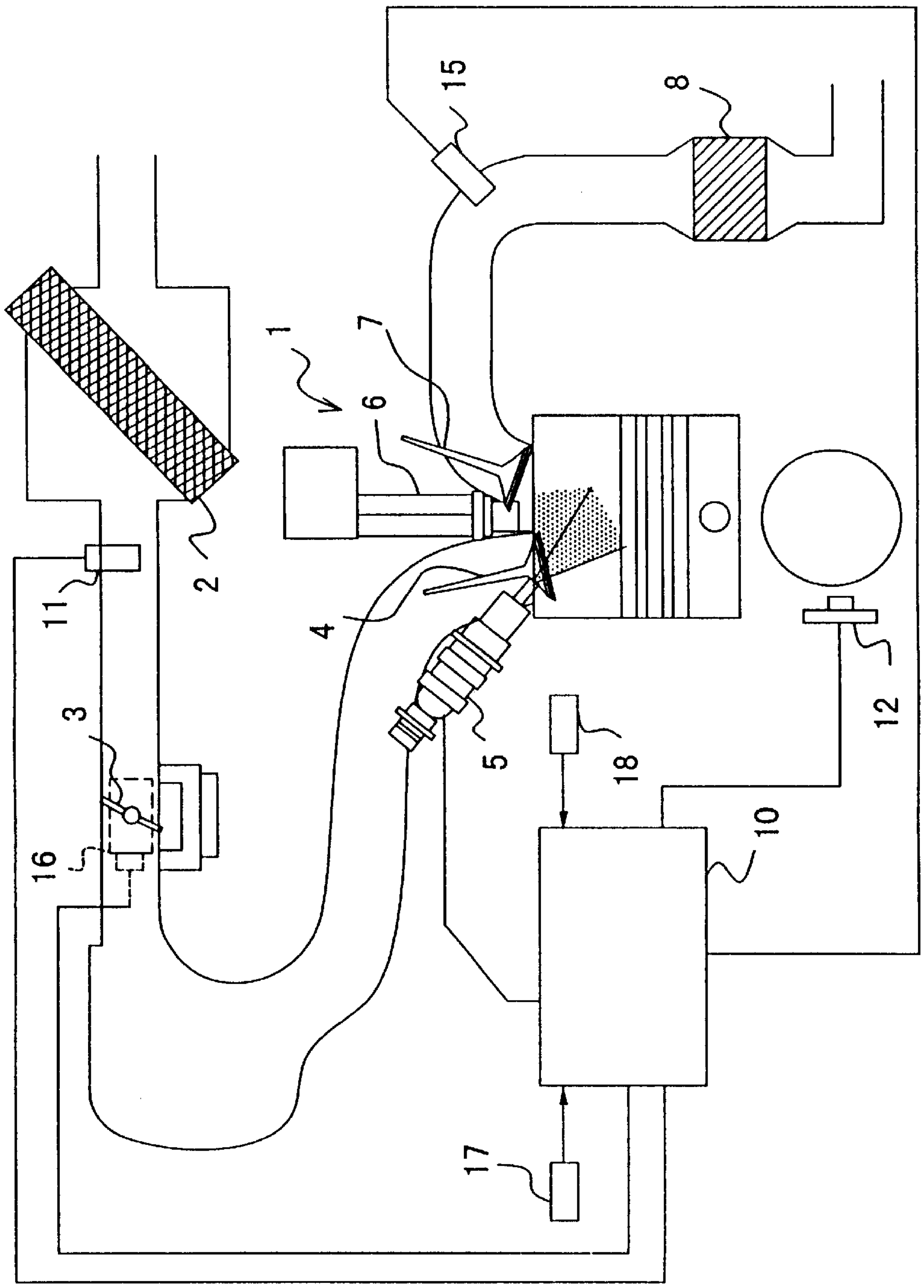
FIG. 1 shows a system structure of an engine according to one embodiment of the present invention.

FIG. 1 is a drawing showing an engine according to the embodiments of the present invention, wherein the engine 1 shown in the drawing is an inter-cylinder injection-type spark ignition gasoline engine, as will be explained in detail in the following. However, the engine 1 is not limited to an inter-cylinder injection-type gasoline engine, but may be an engine performing port injection.

Air passing through an air cleaner 2, and measured at a throttle valve 3, is sucked into a cylinder of the engine 1 through an intake valve 4.

An electromagnetic-type fuel injection valve 5 is formed so as to directly inject fuel (gasoline) into a combustion chamber, and an air-fuel mixture is formed inside the cylinder by the fuel injected from the fuel injection valve 5.

The air-fuel mixture is ignited and combusted by the spark ignition performed by an ignition plug 6. The exhaust gas is discharged from the cylinder through an exhaust valve 7 to be purified by a catalytic converter 8, before being emitted to the atmosphere.

A control unit 10 incorporating a microcomputer controls the fuel injection by the fuel injection valve 5 and the ignition by the ignition plug 6 (supply of power to an ignition coil not shown in the drawing). Signals from various sensors are input to the control unit 10.

Said various sensors include an airflow meter 11 for detecting an intake air quantity Q of the engine 1, an oxygen sensor 15 for detecting an air-fuel ratio of the combustion mixture by sensing the oxygen concentration in the exhaust gas, a throttle sensor 16 for detecting the opening TVO of the throttle valve 3, and a water temperature sensor 17 for detecting the cooling water temperature Tw.

Moreover, a crankshaft sensor 12 is equipped for taking out a detection signal synchronized with the rotation of a crankshaft from a signal plate axially supported by the crankshaft, and for outputting a position signal POS (detection signal) at every 10° of crank angle (every unit crank angle).

Figure 2:
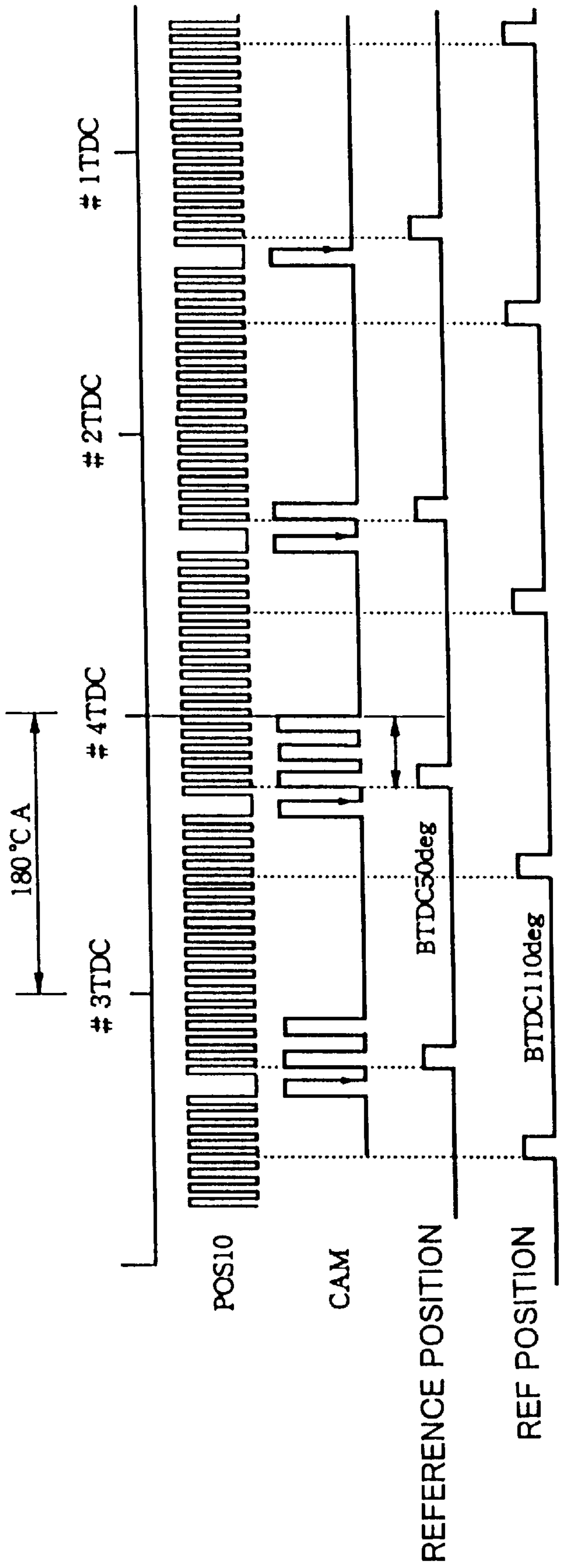
FIG. 2 is a time chart showing the outline of a reference position detection according to the embodiment of the present invention.

The crankshaft sensor 12 outputs a position signal POS 10 at every 10° of the crank angle with TDC as reference, but, as shown in FIG. 2, the sensor 12 is set so as not to output the position signal POS 10 by one pulse corresponding to 60° of BTDC, thereby creating a signal omission.

A camshaft sensor 18 is equipped to the engine for taking out a detection signal synchronized with the rotation of a camshaft from a signal plate axially supported by the camshaft, and for outputting the same number of pulse signals CAM (detection signals) as the cylinder number at every angle corresponding to the stroke phase difference of each cylinder.

In case the engine 1 according to the present embodiment is a straight type four cylinder engine, the stroke phase difference of each cylinder is 180° CA. If the order of ignition is #1→#3→#4→#2, then the camshaft sensor 18 will repeatedly output pulse signals in the order of 1 pulse→3 pulses→4 pulses→2 pulses at every 180° CA as shown in FIG. 2. Therefore, 10 pulses will be output at 720° CA, corresponding to one cycle of the output patterns of the pulse signals. In such case, the output position of the leading pulse (reference signal) in the pulse group output at every 180° CA (every reference position) is set to approximately correspond to 60° of BTDC where omission of the position signal POS 10 occurs.

When the control unit 10 detects the falling of the leading pulse output by the camshaft sensor at every 180° CA, as shown in FIG. 2, it determines the position of the position signal POS 10 input for the first time after the detection as the reference position (BTDC 50°). The control unit 10 determines the position after the reference position (BTDC 50°) by twelve position signals POS 10, that is, position corresponding to BTDC 110° (ATDC 70°), as the final control reference position REF, and utilizes the same for controlling the ignition or fuel injection timing.

In the present embodiment, the position corresponding to BTDC 110° is determined as the final control reference position REF. However, BTDC 110° is detected with the reference position (BTDC 50°) detected based on the position signal POS 10 input for the first time after the falling of the leading pulse as the reference position, so BTDC 50° may be substantially regarded as the control reference position for the position signal POS 10. Further, it is obvious that the unit crank angle, the omitted position of the position signal POS 10, the reference position, and the control reference position REF are not limited to the values disclosed above.

Figure 3:
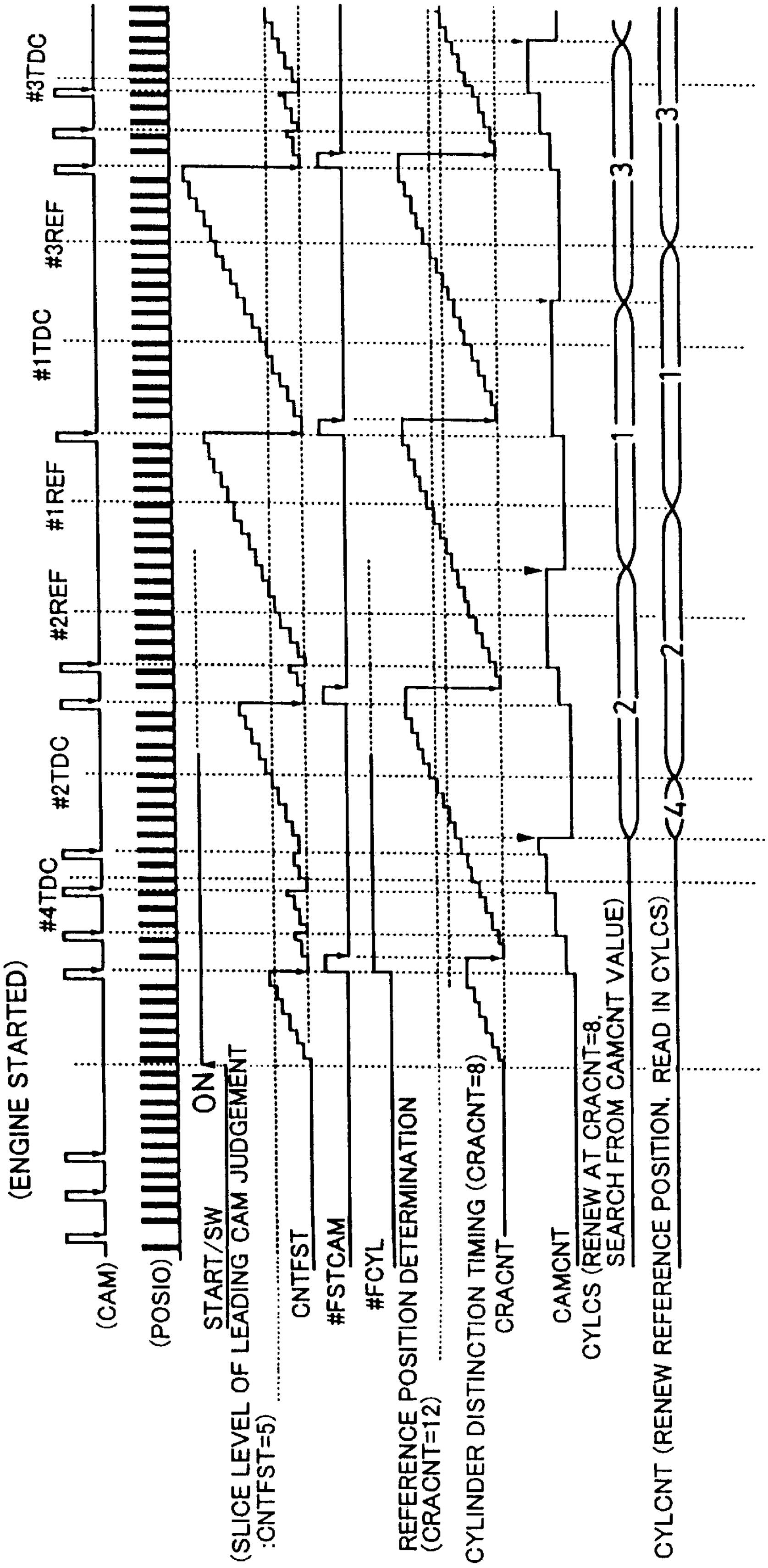
FIG. 3 is a time chart showing the detail of the reference position detection according to the embodiment of the present invention.
Figure 4:
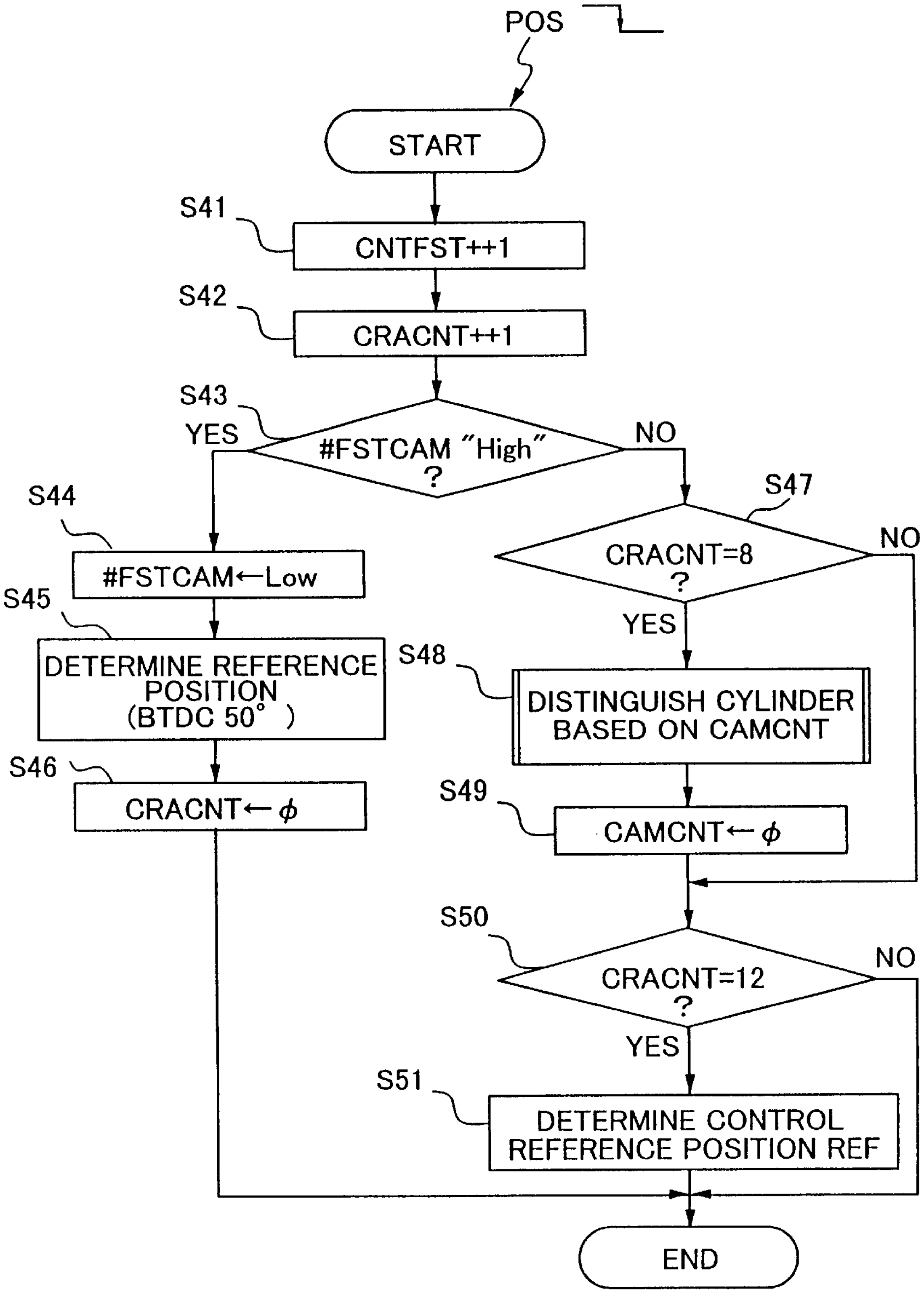
FIG. 4 is a flowchart showing the outline of the reference position detection according to the embodiment of the present invention.
Figure 5:
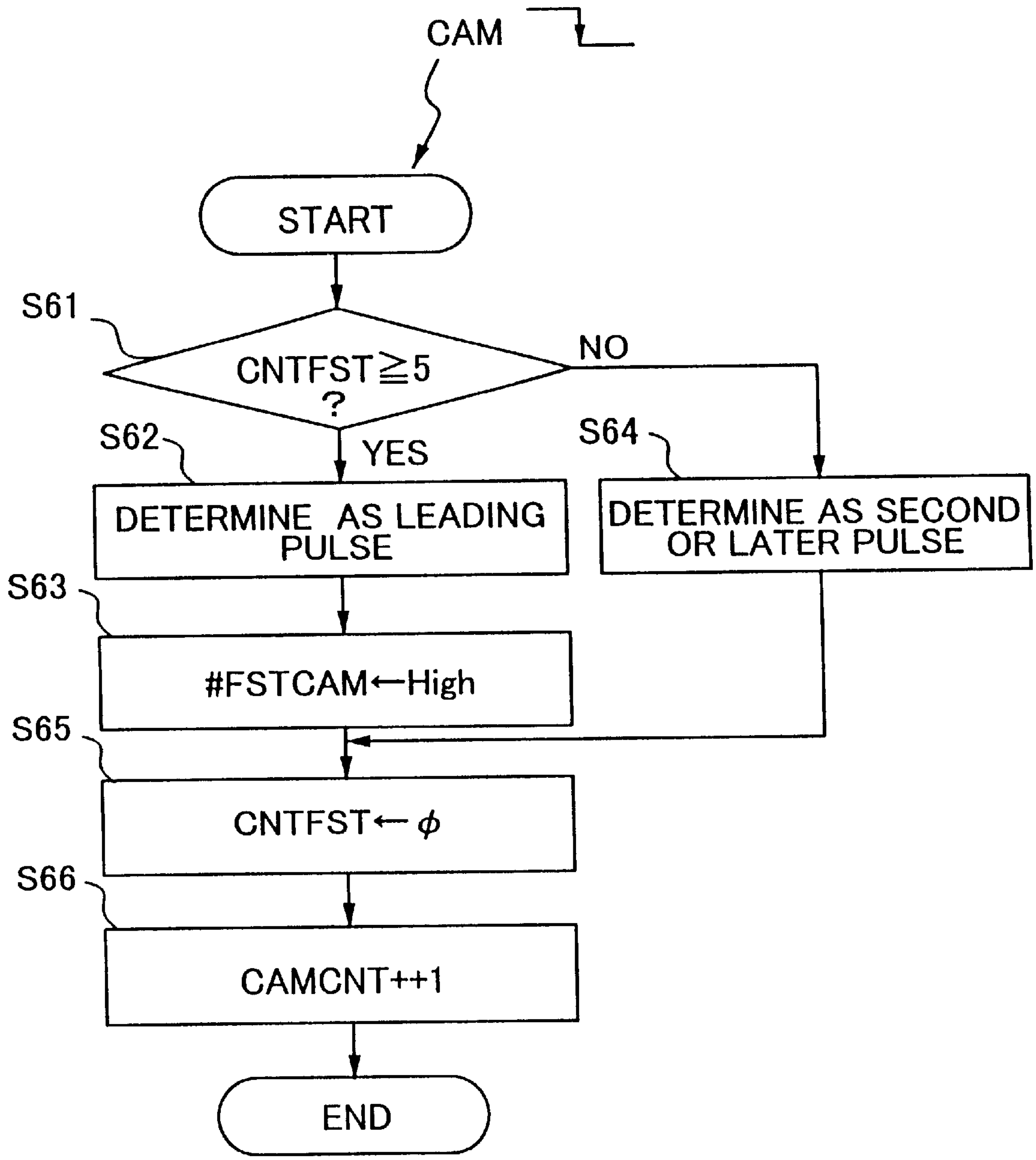
FIG. 5 is a flowchart showing the outline of the reference position detection according to the embodiment of the present invention.

Next, the method of detecting the leading pulse, the reference position and the control reference position REF by the control unit 10 will be explained in detail with reference to the time chart of FIG. 3 and the flowcharts of FIGS. 4 and 5.

Every time the falling edge of the position signal POS 10 is input, 1 is added to the value (count value) on the counter CNTFST (S41: counting device). Further, the counter CNTFST is set to be cleared to zero every time the falling edge of the pulse signal from the camshaft sensor 18 is input (S65: clearing device).

When the falling edge of the pulse signal from the camshaft sensor 18 is input, in advance to clearing the counter CNTFST, the value on the counter CNTFST and a threshold value (for example, 5) set in advance is compared (S61). When the value on the counter CNTFST is equal to or above the threshold value, the falling edge of the pulse signal input at that time from the camshaft sensor 18 is determined as the leading pulse (S62: reference signal detecting device). When the value on the counter CNTFST is less than the threshold value, then the falling edge of the pulse signal is determined to be input in continuation to the leading pulse (S64). After the determination, the counter CNTFST is cleared to zero (S65).

The generation cycle of the pulse signal output from the camshaft sensor 18 is relatively short between the pulse signals having numbers corresponding to the cylinder number output in continuation to the leading pulse. On the other hand, the interval of the pulse signals between the last pulse signal and the next leading pulse is long. Therefore, by setting the threshold value to a value that will not be counted up for the interval of consecutive pulse signals, the leading pulse may be determined when the value of the counter CNTFST is equal to or above the threshold value.

In other words, by the combination of the output pattern of a constant cycle of the crankshaft sensor 12 and the output pattern of the pulse signal CAM output by the camshaft sensor 18, the pattern of the variation in the cycle of the pulse signal CAM output by the camshaft sensor 18 may be recognized, and such variation in the cycle may be detected based on the value of the counter CNTFST.

Further, the initial value of the counter CNTFST to be compared with the threshold value is set to zero, and when the position signal POS 10 is generated by the starting of the engine, the counting starts. If the ON position of the starting switch is prior to the leading pulse by more than a threshold value, then the first leading pulse may be detected.

When the leading pulse is determined, the reference position signal #FSTCAM is raised (S63), and then, synchronous with the falling edge of the position signal POS 10 input for the first time after the rising of the reference position signal, the reference position signal #FSTCAM falls (S44). The falling edge of the reference position signal #FSTCAM is determined as the reference position (BTDC 50°) (S45: control reference position detecting device).

Apart from the counter CNTFST, another counter CRACNT is mounted for counting up by 1 at every input of the falling edge of the position signal POS 10 (S42). The counter CRACNT is set to be cleared to zero synchronous with the falling edge of the reference position signal #FSTCAM (S46).

Then, when the counter CRACNT is set to 12 (S50), the falling edge of the position signal POS 10 at that time is determined as the control reference position REF (S51: control reference position detecting device).

Moreover, a counter CAMCNT is mounted for counting up by 1 at every input of the falling edge of the pulse signal CAM from the camshaft sensor 18 (S66). When the counter CRACNT reaches a predetermined value (for example, 8) set as the cylinder distinction timing (S47), the value of the counter CAMCNT is referred to in order to perform a cylinder distinction CYLCS (S48). After distinguishing the cylinder, the counter CAMCNT is cleared to zero (S49).

At the control reference position REF, the result of the cylinder distinction CYLCS is read-in and renewed, and based on the renewed cylinder distinction CYLCS, the control of the ignition timing, the injection timing and the like are performed with the control reference position REF as the reference position.

As mentioned above, the position signal POS 10 being input for the first time after the detection of the leading pulse (reference signal) is determined as the reference position. Therefore, when the generation timing of the position signal POS 10 and the generation timing of the pulse signal CAM by the camshaft sensor 18 are different from each other, there is a fear that a different position signal POS 10 may be detected as the reference position instead of the position signal POS 10 that should originally be detected as the reference position.

However, as above, if the leading pulse is set to be generated at the portion where a signal output of the position signal POS 10 is omitted, the difference of timing in the portion where the distance between the position signals POS 10 is widened by the omission of a signal does not provide any effect to the detection of the reference position. Compared to the case where the position signal POS 10 is output at every unit crank angle without any omission, the permissible degree of the difference in timing according to the present embodiment is doubled. Moreover, the angle resolution by the position signal POS 10 will not be decreased.

The camshaft sensor 18 and the crankshaft sensor 12 may be an optical type, or they may utilize an electromagnetic pickup mechanism, or may even utilize a Hall element.

Further, the engine comprising a variable valve device for changing the valve timing by varying the phase of a camshaft equipped with a camshaft sensor with respect to the crankshaft may be constituted as explained in the following, in order to detect the reference position, to distinguish the cylinder and to detect the phase of the camshaft with respect to the crankshaft based on the camshaft sensor and the crankshaft sensor where the output of the position signal POS 10 is omitted.

Figure 6:
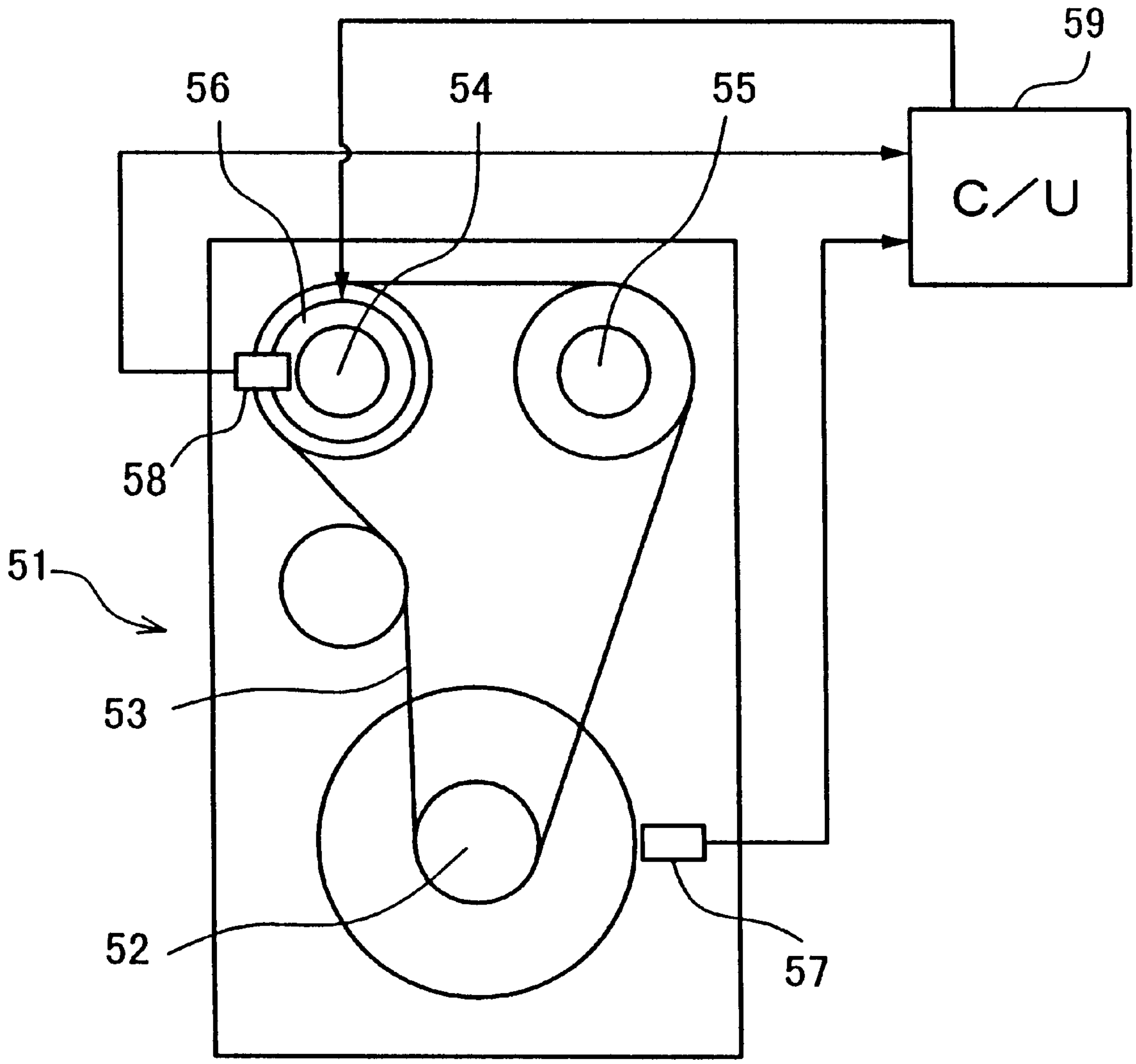
FIG. 6 shows a system structure of another embodiment of the present invention.

FIG. 6 is a system diagram showing an engine equipped with the variable valve device.

The engine 51 shown in the drawing is a four cylinder engine, and the ignition order is set to be #1→#3→#4→#2.

A crankshaft 52 of the engine 51 is formed to drive an intake valve side camshaft 54 and an exhaust valve side camshaft 55 via a timing belt 53 and the like. The intake valve side camshaft 54 and the exhaust valve side camshaft 55 are rotated once in every two rotations of the crankshaft 52.

Further, the intake valve side camshaft 54 is driven by the crankshaft 52 through a variable valve device 56 so that the phase of the camshaft 54 is advanced or delayed with respect to the crankshaft 52. Generally, the variable valve device 56 controls the phase of the intake valve side camshaft 54 to the most delayed angle condition with respect to the crankshaft 52 at the starting time.

A crankshaft sensor 57 is mounted for the crankshaft 52. Further, a camshaft sensor 58 is mounted for the intake valve side camshaft (hereinafter called camshaft)54. Signals from these sensors 57 and 58 are input to a control unit 59.

The crankshaft sensor 57 is fixed to a position facing a signal disk plate comprising teeth (or slits) for outputting signals mounted to the outer peripheral thereof with even intervals (for example, a 10° interval), the disk plate being fixed to and rotated with the crankshaft 52. The crankshaft sensor 57 detects the teeth and outputs signals correspondingly. However, of the teeth mounted with even intervals, one tooth at the reference position is removed, so as to form a omitted portion of the tooth. Therefore, the crankshaft sensor 57 will not output signals at detecting positions of the omitted portion of the tooth.

Figure 7:
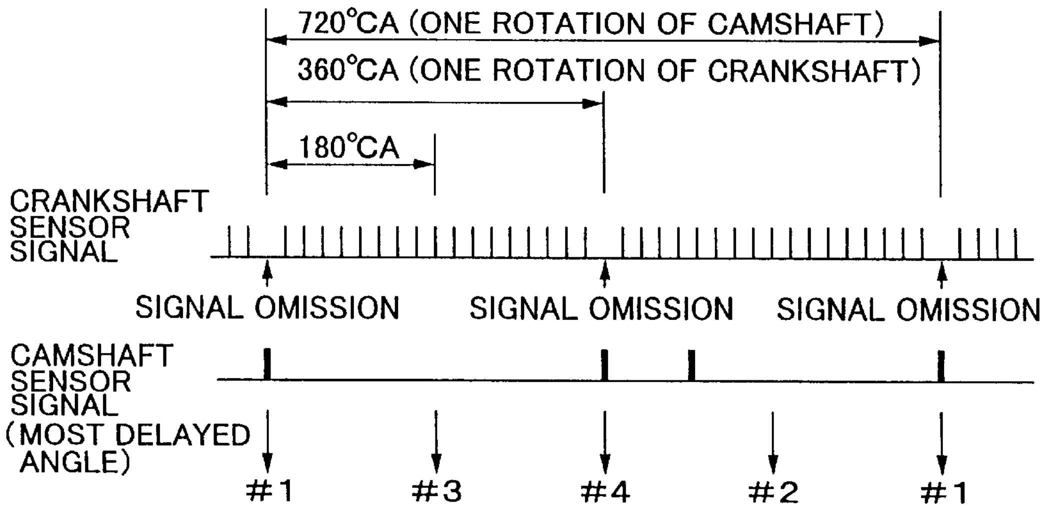
FIG. 7 is an explanatory view of the crankshaft sensor signal and the camshaft sensor signal (at a most delayed angle condition)

Accordingly, the signals output by the crankshaft sensor 57 may be shown as in FIG. 7. The signals are output in positions corresponding to each predetermined crank angle (for example, 10° CA; however, for simplification, FIG. 7 shows the example of 20° CA) synchronous with the rotation of the crankshaft 52. However, of each position corresponding to a crank angle, a signal will not be output at one reference position determined in advance.

The camshaft sensor 58 is fixed to a position facing a signal disk plate comprising teeth (or slits) for outputting signals mounted to three positions on the outer peripheral thereof, for example, two positions with 180° intervals and one position separated from one of the two positions by a predetermined angle (for example, 45°), the disk plate being fixed to and rotated with the camshaft 54. The camshaft sensor 58 detects the teeth and outputs a cylinder distinction signal.

The two out of the plural cylinder distinction signals are set, as shown in FIG. 7, to correspond to the reference positions (the non-output positions of the crankshaft sensor signal corresponding to the tooth omission portion) at a most delayed angle of the camshaft 54 by the variable valve device 56. Moreover, the output of said two signals are set to correspond to cylinder #1 and cylinder #4, and the remaining single signal is set to be output for the judgement of cylinder #4.

Figure 8:
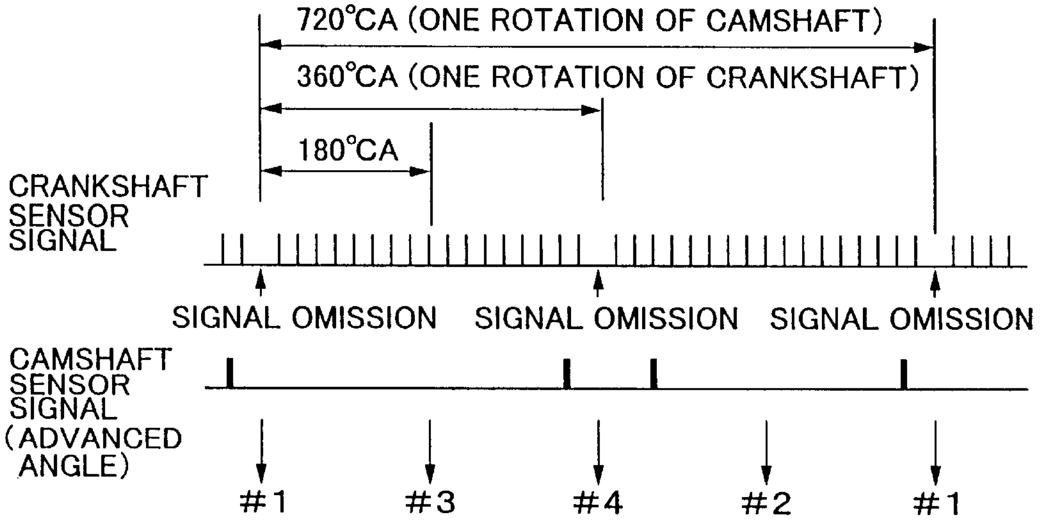
FIG. 8 is an explanatory view of the crankshaft sensor signal and the camshaft sensor signal (at an advanced angle condition)

Therefore, the signal from the camshaft sensor 58 will be output as shown in FIG. 7, when the camshaft 54 is set to the most delayed angle by the variable valve device 56. When the phase of the camshaft 54 is advanced by the variable valve device 56, the output of the camshaft sensor would be as shown in FIG. 8.

According to such a constitution, the reference position may be noticed by the change in the cycle of signals output by the crankshaft sensor 57, since the signals having even intervals will not be output by the crankshaft sensor 57 at the reference position of the crankshaft 52, and further, by a signal from the camshaft sensor 58 being output at the non-output position of the signal from the crankshaft sensor 57 at the starting time. By counting the crankshaft sensor signals with this reference position as reference, the crank angle position may be detected.

Further, by setting the cylinder distinction signal of the camshaft sensor 58 so as to correspond to the reference position of the crankshaft 52 at the starting time while the variable valve device 56 sets the camshaft to the most delayed angle, both the distinction of the cylinder and the adjustment of the variable valve device 56 are enabled.

Thereafter, even if the variable valve device 56 is controlled so as to vary (advance) the phase of the camshaft 54 with respect to the crankshaft 52, it is still easy to distinguish the cylinders from the cylinder distinction signal, since the cylinder distinction signals of the camshaft sensor 58 appear before the reference position. Moreover, the phase of the intake side camshaft 54 with respect to the crankshaft 52 may be detected as the phase difference between the non-output position of the signal from the crankshaft sensor 57 and the signal from the camshaft sensor 58.

Next, the method of distinguishing the cylinders are explained with reference to the flowchart shown in FIGS. 9 and 10.

Figure 9:
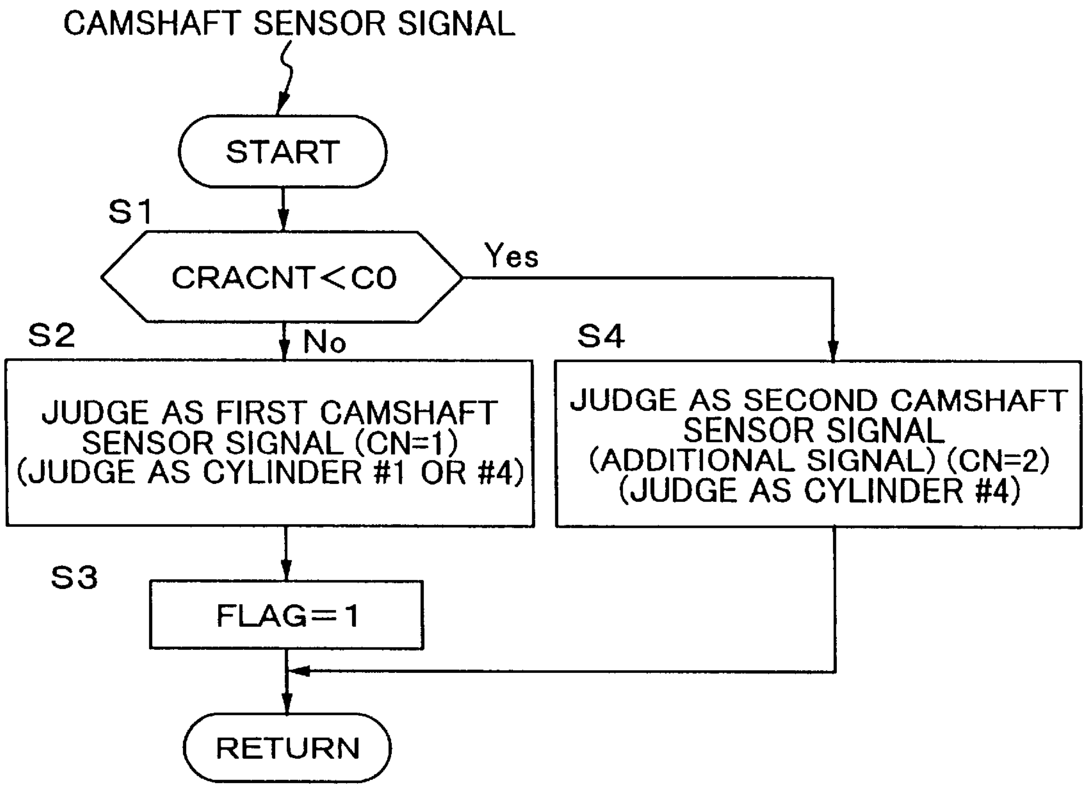
FIG. 9 is a flowchart of a first cylinder judgement routine.

FIG. 9 shows the routine for distinguishing the first cylinder, and interrupt handling is performed synchronously with the generation of the camshaft sensor signal.

In S1, determination is made on whether the interval from the generation of the prior camshaft sensor signal is smaller than the predetermined value or not. Actually, determination is made on whether the counter CRACNT counting the crankshaft sensor signal by the second cylinder distinction routine of FIG. 10 to be described below is smaller than a predetermined value C0 (for example, a value corresponding to 100° CA) or not.

When CRACNT≧C0, then the procedure is advanced to S2, where the signal is determined as the first camshaft sensor signal, and CN is set to 1. In this case, the cylinder may be determined as either cylinder #1 or cylinder #4. Then, in S3, 1 is set to the first signal generation flag (FLAG) of the camshaft sensor signal, and the whole routine ends.

If CRACNT<C0, then procedure is advanced to S4, where the signal is determined as the second camshaft sensor signal (additional signal), and CN is set to 2. In this case, the cylinder is determined as cylinder #4. Then, the whole routine ends.

Figure 10:
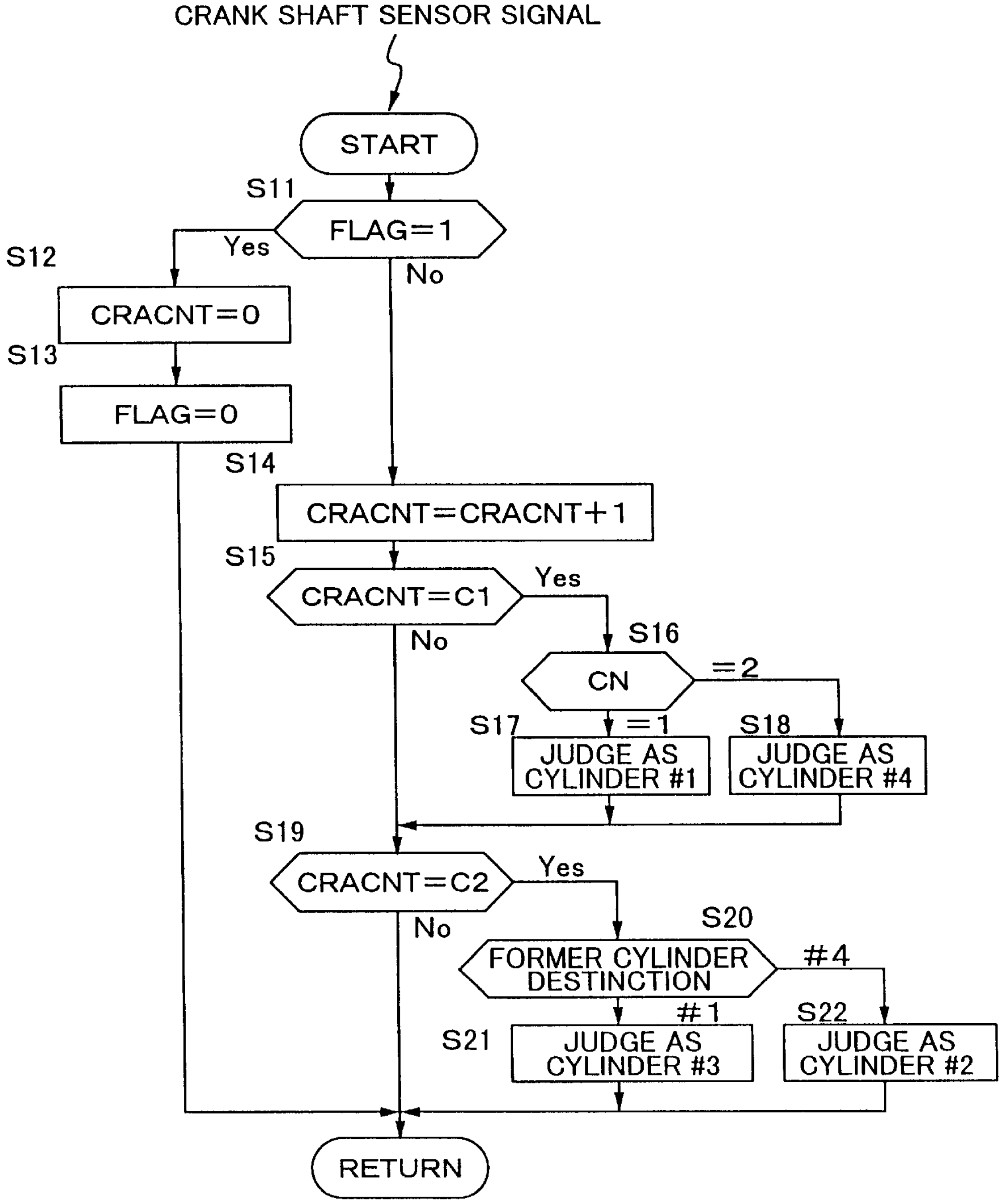
FIG. 10 is a flowchart of a second cylinder judgement routine.

FIG. 10 shows the routine for distinguishing the second cylinder, and interrupt handling is performed synchronously with the generation of the crankshaft sensor signal.

In S11, determination is made on whether the flag (FLAG) equals 1 or not.

When FLAG equals 1, then procedure is advanced to S12, where the counter CRACNT counting the crankshaft sensor signal is cleared (CRACNT=0), and thereafter, in S13, the FLAG is cleared (FLAG=0), ending the present routine.

When FLAG equals 0, then procedure is advanced to S14, where the counter CRACNT is incremented, for counting the crankshaft sensor signal (CRACNT=CRACNT+1).

Then, in S15 and S19, the value of the counter CRACNT is determined.

In S15, determination is made on whether the counter CRACNT has reached a first predetermined value C1 (for example, a value corresponding to 100° CA). When CRACNT equals C1, then the distinction of the cylinder is performed.

That is, in S16, determination is made on whether CN equals 1 (no additional signal) or CN equals 2 (with additional signal). When CN equals 1, then in S17, the cylinder is distinguished as cylinder #1. When CN equals 2, then in S18, the cylinder is distinguished as cylinder #4.

In S19, determination is made on whether the counter CRACNT has reached a second predetermined value C2 (for example, a value corresponding to 180° CA), and when CRACNT equals C2, then the cylinder number is distinguished.

That is, in S20, the result of the prior cylinder distinction is referred to. When the result of the prior distinction was cylinder #1, then in S21, the cylinder number is distinguished as cylinder #3. When the result of the prior distinction was cylinder #4, then in S22, the cylinder number is distinguished as cylinder #2.

According to the present invention, the cylinder number may be distinguished by only a small number of signals.

What we claimed are:

1. A crank angle detecting apparatus of an engine, comprising:

- a crankshaft sensor for outputting detection signals synchronous with the rotation of a crankshaft, said crankshaft sensor being set to output said detection signals at every unit crank angle, and at the same time, and to omit the output of a detection signal at every constant crank angle;
- a camshaft sensor for outputting detection signals synchronous with the rotation of a camshaft, said camshaft sensor being set to output a detection signal at every position where a detection signal to be output by said crankshaft sensor is omitted, and to further output detection signals for distinguishing cylinders subsequent to said detection signals output at signal omitted positions;
- a counting means for counting up the value of a counter at every output of the detection signal from said crankshaft sensor; and
- a cam signal distinction means for distinguishing the detection signals output by said camshaft sensor in correspondence to the position where said detection signal to be output by said crankshaft sensor is omitted, based on the value of said counter.

2. A crank angle detecting apparatus of an engine according to claim 1, wherein said position where said detection signal to be output by said crankshaft sensor is omitted is set to a position at each crank angle corresponding to the stroke phase difference between cylinders.

3. A crank angle detecting apparatus of an engine according to claim 1, further comprising:

- a clearing means for clearing the value of said counter at every output of the detection signal from said camshaft sensor,
- wherein said cam signal distinction means distinguishes the detection signals in correspondence to the position where said detection signal to be output by said crankshaft sensor is omitted, when the value of said counter to be cleared is equal to or above a threshold value stored in advance.

4. A crank angle detecting apparatus of an engine according to claim 3, further comprising a control reference position detecting means for detecting the detection signal from said crankshaft sensor to be set as a reference position for controlling the engine, with the detection signal from said camshaft sensor distinguished by said cam signal distinction means as reference.

5. A crank angle detecting apparatus of an engine according to claim 4, wherein said control reference position detecting means detects the detection signal output by said crankshaft sensor for the first time after the output of a detection signal from said camshaft sensor distinguished by said cam signal distinction means, as the reference position for controlling the engine.

6. A crank angle detecting apparatus of an engine according to claim 1, wherein said crank angle detecting apparatus further comprises a variable valve device for varying the phase of said camshaft with respect to said crankshaft, and when said camshaft is placed at a most delayed angle by said variable valve device, said camshaft sensor is set to output a detection signal to a position where said detection signal to be output by said crankshaft sensor is omitted.

7. A method of detecting a crank angle of an engine, comprising:

- providing a crankshaft sensor for outputting detection signals synchronous with the rotation of a crankshaft, and outputting said detection signals at every unit crank angle, while omitting the output of a detection signal at every constant crank angle; and
- providing a camshaft sensor for outputting detection signals synchronous with the rotation of a camshaft, and outputting a detection signal at every position where a detection signal to be output by said crankshaft sensor is omitted, and further outputting detection signals for distinguishing cylinders subsequent to said detection signals output at signal omitted positions,
- wherein the value of a counter is counted up at every output of the detection signal from said crankshaft sensor, and based on the value of said counter, the detection signals output by said camshaft sensor are distinguished in correspondence to the position where the detection signal to be output by said crankshaft sensor is omitted.

8. A method of detecting a crank angle of an engine according to claim 7, further comprising setting said position at which said detection signal to be output by said crankshaft sensor is omitted to a position of every crank angle corresponding to the stroke phase difference between cylinders.

9. A method of detecting a crank angle of an engine according to claim 7, further comprising clearing the value of said counter at every output of the detection signal from said camshaft sensor, and distinguishing the detection signals output by said camshaft sensor corresponding to the position where the detection signal to be output by said crankshaft sensor is omitted, when the value of said counter to be cleared is equal to or above a threshold value stored in advance.

10. A method of detecting a crank angle of an engine according to claim 9, further comprising detecting the detection signal from said crankshaft sensor set as a reference position for controlling the engine, with the detection signal output by said camshaft sensor in correspondence to the position where said detection signal to be output by said crankshaft sensor is omitted as a reference.

11. A method of detecting a crank angle of an engine according to claim 10, further comprising detecting the detection signal output by said crankshaft sensor for the first time after the output of a detection signal by said camshaft sensor in correspondence to the position where said detection signal to be output by said crankshaft sensor is omitted as the reference position for controlling the engine.

12. A method of detecting a crank angle of an engine according to claim 7, further comprising a variable valve device for varying the phase of said camshaft with respect to said crankshaft, wherein when said camshaft is placed at a most delayed angle by said variable valve device, said camshaft sensor is set to output a detection signal at a position where said detection signal to be output by said crankshaft sensor is omitted.

* * * * *